(12) United States Patent
Toennessen

(10) Patent No.: US 8,320,215 B2
(45) Date of Patent: Nov. 27, 2012

(54) STEERING SYSTEM AND METHOD FOR USE IN SEISMIC SURVEY APPLICATIONS

(75) Inventor: Rune Toennessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 418 days.

(21) Appl. No.: 12/641,164

(22) Filed: Dec. 17, 2009

(65) Prior Publication Data

US 2010/0182871 A1 Jul. 22, 2010

Related U.S. Application Data

(60) Provisional application No. 61/145,431, filed on Jan. 16, 2009, provisional application No. 61/223,238, filed on Jul. 6, 2009.

(51) Int. Cl.
*G01V 1/38* (2006.01)
(52) U.S. Cl. .......................................... 367/17; 114/245
(58) Field of Classification Search ................... 367/17; 114/248, 245
See application file for complete search history.

(56) References Cited

U.S. PATENT DOCUMENTS

| 5,540,406 | A | * | 7/1996 | Occhipinti | 244/200 |
| 5,619,474 | A | * | 4/1997 | Kuche | 367/17 |
| 7,423,929 | B1 | | 9/2008 | Olivier | |
| 2003/0230670 | A1 | * | 12/2003 | Fujino | 244/35 R |
| 2006/0176774 | A1 | | 8/2006 | Toennessen | |
| 2006/0176775 | A1 | | 8/2006 | Toennessen | |

FOREIGN PATENT DOCUMENTS

WO 2007138136 A1 12/2007

OTHER PUBLICATIONS

PCT Search Report, dated Aug. 13, 2010, Application No. PCT/US2009/068661.

* cited by examiner

*Primary Examiner* — Mark Hellner

(57) ABSTRACT

A technique facilitates the steering of seismic survey related devices during seismic survey applications. A steering device is provided with a wing pivotably mounted to a body via a pivot member. As the steering device is moved through a liquid, the liquid acts against the wing and creates a torque about the pivot member which varies according to the angle of attack of the steering device. The steering device further comprises at least one feature designed to change the torque that would otherwise act on the pivot member.

18 Claims, 2 Drawing Sheets

US 8,320,215 B2

STEERING SYSTEM AND METHOD FOR USE IN SEISMIC SURVEY APPLICATIONS

CROSS-REFERENCE TO RELATED APPLICATION

The present document is based on and claims priority to U.S. Provisional Application Ser. No. 61/145,431, filed Jan. 16, 2009, and U.S. Provisional Application Ser. No. 61/223,238, filed Jul. 6, 2009.

BACKGROUND

In a variety of marine environments, seismic surveys are conducted to gain a better understanding of geological formations beneath a body of water. In some applications, steering mechanisms are used to steer streamers through the ocean. The steering mechanism may comprise a seismic streamer bird or similar device to which the streamer is connected while the seismic streamer bird is pulled through the ocean. The seismic streamer bird comprises a body and a wing that is adjustable with respect to the body. During movement through the ocean, the seismic streamer bird is subjected to torques as fluid flows past the wing, and these torques can limit performance of the steering mechanism.

SUMMARY

In general, the present invention provides a methodology and system able to facilitate steering during seismic survey applications. A steering device is provided with a wing pivotably mounted to a body via a pivot member. As the steering device is moved through a liquid, the liquid acts against the wing and creates a torque about the pivot member which varies according to the angle of attack of the steering device. The steering device also comprises at least one feature which changes the torque that would otherwise act on the pivot member.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

Figure 1:
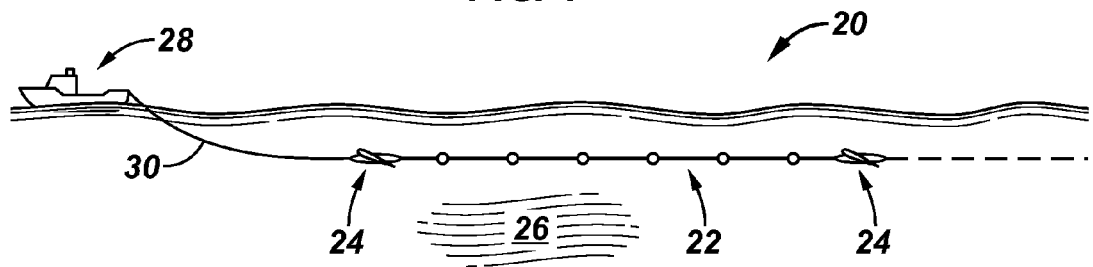
FIG. 1 is a schematic view of a seismic vessel pulling a steering device which, in turn, is pulling a seismic survey related system in a marine survey area, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for improving the ability to provide dependable steering of devices in a marine environment. In one embodiment, the present invention provides steering for streamers employed in seismic survey applications. However, the steering systems described herein also may be used in steering acoustic sources, buoys, or other marine seismic devices.

The system and methodology for steering employ a steering device having a body and a wing pivotably mounted to the body. The angle of the wing with respect to the body may be adjusted by an actuator, such as a motor, deployed in the steering device. The wing is manipulated about the pivot axis to adjust its angle of attack ($\alpha$) relative to the ambient flow of liquid, thereby creating hydrodynamic lift. As described below, the wing of the steering device may be optimized with respect to reducing torque moment at greater angles of attack while at the same time maintaining a desirable, e.g. positive, gradient of the torque curve (torque versus angle of attack) as the angle of attack approaches zero. By way of example, positive torque may be considered positive torque restoring. Positive torque restoring means that the wing of the steering device, if brought to an angle of attack different than zero, will try to move back to a zero angle of attack orientation under the influence of hydrodynamic forces acting on the wing.

The steering device may be designed with a variety of features to facilitate movement through liquid, e.g. movement through the ocean, while providing desired torque characteristics resulting from passage of the wing through the liquid. The desired torque characteristics may, for example, limit forces acting on steering device components, such as on the motor or other actuator used to adjust the angular positioning of the wing. According to one embodiment, the features comprise selecting a wing profile such that the pivot axis of the wing is close to the zero-moment axis. In some designs, this zero-moment axis is located at approximately 25 percent of the length of the wing measured from the leading edge of the wing.

Additionally, one or more features may be used to provide a desired torque curve based on torque versus angle of attack. For example, the torque curve gradient may be maintained positive as the torque curve approaches zero by creating a trailing edge of the wing that is blunt with relatively sharp transition edges. Features also may be incorporated into the steering device to lower the torque incurred at higher angles of attack by adding a turbulence trigger mechanism. In one example, a turbulence strip is placed along the span of the wing at a position approximately 5 percent to 15 percent of the chord length of the wing measured from its leading edge. Such features may be used in various combinations to control the torque that results from moving the wing through liquid.

Referring generally to FIG. 1, an example of a seismic survey system 20 is illustrated according to one embodiment of the present invention. As illustrated, system 20 comprises a seismic survey device or devices 22 towed by one or more steering devices 24. Each steering device 24 is pulled through a liquid, e.g. pulled through a marine environment 26 such as the ocean, by a tow vessel 28. The tow vessel 28 may be connected to a lead steering device 24 by a tether 30 or other type of structure for pulling steering devices 24 and seismic survey devices 22. By way of example, seismic survey devices 22 may comprise seismic streamers, seismic sources, buoys, or other marine seismic devices. It should be noted that in FIG. 1 only a portion of the seismic survey device 22 is illustrated because the seismic survey devices may be quite long in many applications. For example, a streamer may be 4 to 12 kilometers in length with multiple steering devices, e.g. steering devices applied at 200 meter to 400 meter intervals along the streamer. However, the streamers may be shorter or longer, and the steering device intervals may be smaller or larger, e.g. 100 meters to 1000 meters. With some streamers, such as those which are positioned laterally, a larger deflector/steering device may be connected at the front between the streamer and a tow cable (lead-in).

Figure 2:
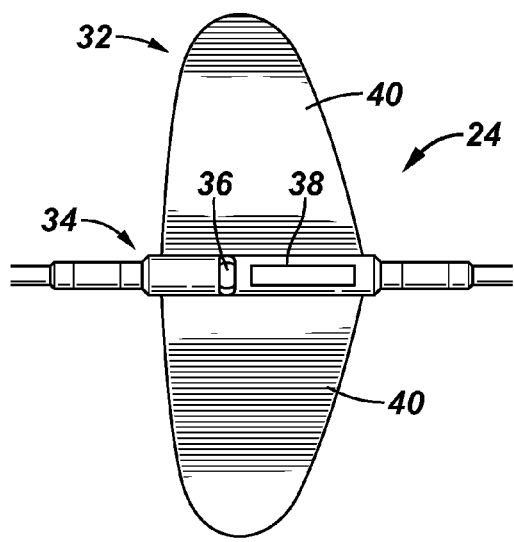
FIG. 2 is an orthogonal view of one embodiment of a steering device, according to an embodiment of the present invention.

With additional reference to FIG. 2, one embodiment of the steering device 24 is illustrated in greater detail. In the embodiment illustrated, the steering device 24 comprises a wing 32 mounted to a steering device body 34 via a pivot member 36. The wing 32 may be pivoted relative to body 34 by an actuator 38, e.g. a motor, coupled to pivot member 36. As illustrated, wing 32 comprises a pair of wings or wing members 40 that extend laterally outward from steering device body 34 on opposite sides of the steering device body. The pivot member 36 may comprise a single member connected between wings/wing members 40 and coupled with actuator 38, or the pivot member 36 may comprise a plurality of pivot members, e.g. two pivot members, coupled between the actuator 38 and corresponding wings/wing members 40.

The wings 40 are designed to provide increased lift while limiting the increase in hydrodynamic torque force about the pivot axis defined by pivot member 36. By way of example, doubling the lift capability can easily be accomplished by doubling the wing area, but without the torque mitigating features described below, the increased torque moment of the hydrodynamic torque force acting about the pivot axis is increased by a factor of 2.8. As described in greater detail below, wing features are used to control the torque moment of the wing 32, e.g. hydrofoil, of steering device 24.

Figure 3:
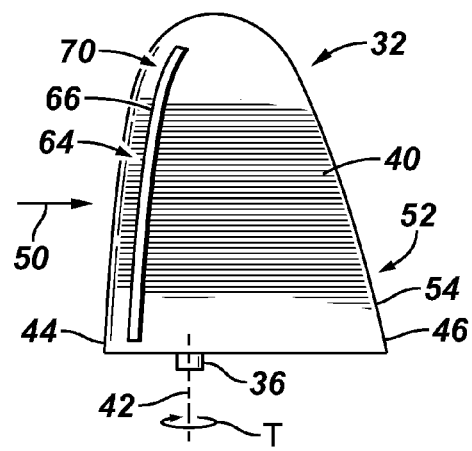
FIG. 3 is a plan view of one side of a wing that forms part of the steering device illustrated in FIG. 2, according to an embodiment of the present invention.
Figure 4:
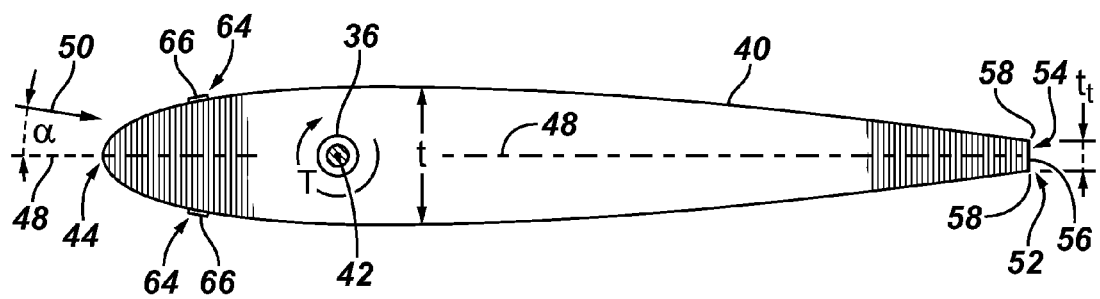
FIG. 4 is a profile view of the wing illustrated in FIG. 3, according to an embodiment of the present invention.

Referring generally to FIGS. 3 and 4, the torque moment is labeled (T) and is the hydrodynamic moment acting upon a predefined pivot axis 42 about which pivot member 36 is able to pivot and thus control the position of wing 32 relative to steering device body 34. The pivot axis 42 may be located at a predetermined point along the chord of the wing extending from a leading edge 44 of the wing 32 to a trailing edge 46 of the wing. When the wing is pivoting about axis 42 and the ambient flow is parallel to the chord's axis 48 (see FIG. 4) when in a neutral position, the wing 32 takes an angle of attack α relative to the ambient flow, which is represented by arrow 50 in FIG. 4. The hydrodynamic lift created by wing 32 increases proportionally to the angle of attack α.

In potential flow theory, torque moment T is zero on a two-dimensional wing if the pivot axis is placed at approximately 25 percent of the chord length or length of the wing from leading edge 44. However, a three-dimensional wing in real flow experiences a torque moment T that increases with increasing α, especially for large values of α. Accordingly, when wing 32 is designed with the objective, or at least the partial objective, of minimizing the torque moment, the sweep of the wing and the position of the pivot axis along the chord of the wing extending between leading edge 44 and trailing edge 46 can be adjusted. For a wing without sweep, the position of pivot axis 42 may be selected at approximately 25 percent of the chord length from leading edge 44. In other designs, the neutral pivot axis 42 and thus pivot member 36 may be located elsewhere depending on the amount of sweep. For example, in some designs the pivot axis 42 may be at a position less than 25 percent of the chord length and in other designs the pivot axis may be at a position greater than 25 percent or even greater than 30 percent of the chord length.

In the present example, the design of wing 32 and the position of pivot axis 42 at approximately 25 percent of the length of wing 32 from leading edge 44 provides a torque curve (torque versus angle of attack) that is relatively flat when the attack angle is close to zero. As discussed below, additional wing features may be employed to minimize the torque moment T for various angles of attack α while maintaining a positive slope of T through zero α to maintain stability with respect to wing 32 and steering device 24.

By incorporating additional torque control features into wing 32, greater control over the torque acting about pivot axis 42 is achieved during movement of wing 32 through liquid, e.g. movement through marine environment 26. For example, once the wing sweep and pivot axis location are selected for a given wing design, the torque acting about pivot axis 42 (the slope of T) as the angle of attack approaches zero may be increased via a torque feature 52. In this example, torque feature 52 comprises a blunt trailing edge 54 having a thickness or height represented as ($t_t$). The blunt trailing edge 54 may be formed with a generally flat surface 56 that transitions to adjacent wing surfaces via relatively sharp corners 58. The blunt trailing edge 54 creates a local drag area on the flat surface 56 facing aft. As the thickness of blunt trailing edge 54 is increased and/or as the corners 58 become sharper, the resultant drag suction force increases.

In some applications, the desired drag force can be achieved by selecting the ratio of thickness $t_t$ of blunt trailing edge 54 to the thickness (t) of wing 32 as greater than or equal to 0.1. In other words, the thickness of blunt trailing edge 54 is at least 10% of the thickness of wing 32. Additionally, the radius ($R_t$) of each corner 58 may be selected as less than or equal to $t_t/2$. However, the size and configuration of blunt trailing edge 54 may vary and may be outside of these ranges for specific applications.

Figure 5:
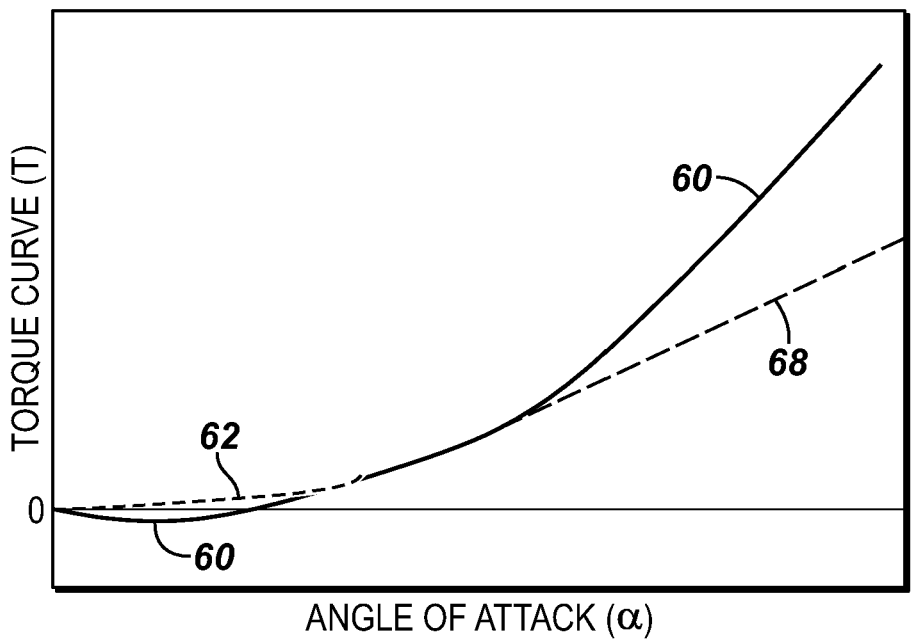
FIG. 5 is a graphical representation of a torque curve showing the change in torque that results from an increasing angle of attack, according to an embodiment of the present invention

It should be noted that use of torque feature 52 enables wing 32 to be designed initially with slope T, at least proximate the zero angle of attack, being zero or even slightly negative because addition of torque feature 52 raises the slope of T into positive territory. As illustrated by the graph of FIG. 5, a torque curve 60 for a wing without torque adjustment features may dip into negative territory as the angle of attack α approaches zero. However, addition of torque feature 52 raises the torque curve into positive territory as represented by graph segment 62.

Referring again to FIGS. 3 and 4, another torque feature 64 is illustrated. In this embodiment, torque feature 64 is designed to lower the torque acting about pivot axis 42 for larger values of attack angle α. The torque feature 64 may be designed as a turbulence trigger mechanism 66 positioned at a desired surface area of wing 32. For example, turbulence trigger mechanism 66 may be positioned along a span of wing 32, e.g. along an upper portion and a lower portion of each wing member 40, as illustrated in FIGS. 3 and 4. The turbulence trigger mechanism creates a region of turbulent fluid flow as steering device 24 is pulled through marine environment 26 to effectively lower the torque curve T for larger values of α. As illustrated graphically in FIG. 5, without torque feature 64, the torque T acting on pivot member 36 would increase substantially for larger attack angles, as represented by graph line 60. However, addition of torque feature 64, e.g. turbulence trigger mechanism 66, lowers the torque T values at these higher angles of attack, as represented by line 68.

The turbulence trigger mechanism 66 may be positioned at a variety of locations along the surface of wing 32. In the illustrated example, however, the turbulence trigger mechanism 66 is arranged as a strip 70 located at a position between 5 percent and 15 percent of the length of wing 32 along its longitudinal chord as measured from leading edge 44. In one specific example, the strip 70 is located at a position approximately 10 percent of the length of wing 32 from its leading edge 44. Depending on the wing design and the seismic survey application, however, the turbulence trigger mechanism 66 also may be positioned at other locations along the wing.

The turbulence trigger mechanism 66 may be constructed in a variety of configurations. For example, the turbulence trigger mechanism may comprise a strip or area of rough surface, as illustrated by strip 70 in FIG. 3. The rough surface may be created by deforming the surface in a specific area or by adding material to the surface. In one example, grit is adhered or otherwise applied to the surface of wing 32 and the grain size (e.g. grain size of 60 or 120) of the grit can be selected according to the effects desired. The rough surface also may be formed by utilizing teeth, wires, or other protrusions able to instigate turbulent fluid flow as steering device 24 is pulled through a liquid.

Figure 6:
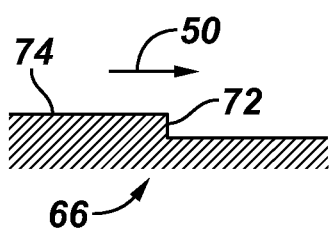
FIG. 6 is a schematic view of a turbulence trigger mechanism that may be used to affect the torque acting on the steering device during operation, according to an embodiment of the present invention.
Figure 7:
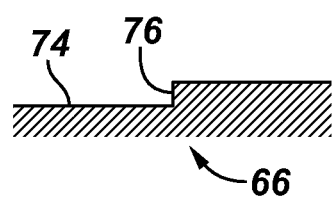
FIG. 7 is a schematic view of another turbulence trigger mechanism that may be used to affect the torque acting on the steering device during operation, according to an embodiment of the present invention.

Depending on the specific seismic survey application, other turbulence trigger mechanisms also may be employed. As illustrated in FIG. 6, for example, one or more negative steps 72 may be formed in a surface 74 of wing 32. The step 72 is positioned at a desired location, e.g. at the position of strip 70 in FIG. 3, selected to lower the torque values T at higher angles of attack α. In other applications, the turbulence trigger mechanism 66 comprises one or more positive steps 76 that are formed in surface 74, as illustrated in FIG. 7.

Figure 8:
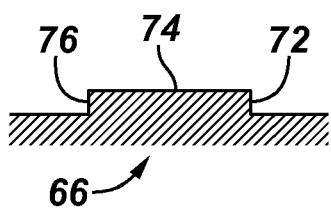
FIG. 8 is a schematic view of another turbulence trigger mechanism that may be used to affect the torque acting on the steering device during operation, according to an embodiment of the present invention.
Figure 9:
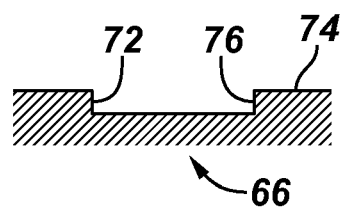
FIG. 9 is a schematic view of another turbulence trigger mechanism that may be used to affect the torque acting on the steering device during operation, according to an embodiment of the present invention.

Various combinations of negative steps and positive steps also may be used to create the desired effects. As illustrated in FIG. 8, for example, a sequential positive step 76 and negative step 74 can be used to create a positive hump. Similarly, a sequential negative step and positive step can be used to create a negative hump or groove, as illustrated in FIG. 9. Additionally, various other combinations of steps, roughened areas, or other surface effects may be used to create the desired turbulent flow.

The torque control features described herein may be utilized in various combinations and configurations. In one design approach, however, the wing 32 is initially designed by selecting the desired sweep of wing 32 and the desired position of pivot axis 42. These features are selected to control the torque affects to the extent possible, e.g. increase torque as the angle of attack approaches zero and decrease torque for greater angles of attack. Subsequently, the torque feature 52, e.g. blunt trailing edge 54, is designed to increase the torque slope T into positive territory as the angle of attack approaches zero. In a further design step, torque feature 64, e.g. turbulence trigger mechanism 66, may be designed to reduce the torque T at higher angles of attack α.

The embodiments discussed above provide examples of steering devices that can be used to steer a variety of seismic survey application systems and components. Depending on the specific application, the size, configuration, and number of steering devices may be adjusted to achieve the goals of the seismic survey application. Furthermore, the specific configuration of the steering device wing or wings may be adjusted to achieve the desired performance for specific applications at desired speeds. Additionally, the torque control features may be used individually or in combination. Similarly, the torque control features may be constructed in several configurations for use at various locations along the wing 32 to achieve desired adjustments to the torque acting on pivot member 36 at various attack angles as the steering device is moved through the marine environment.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method of making a steering system for use in seismic survey applications, comprising:
   mounting a wing to a body via a pivot member to create a steering device in which movement of the steering device through liquid causes the wing to create a torque about the pivot member that varies according to an angle of attack;
   selecting a wing profile having a blunt trailing edge of the wing which maintains a desired torque at angles of attack close to zero; and
   lowering the torque at high angles of attack by providing a turbulence trigger mechanism on the wing.

2. The method as recited in claim 1, further comprising mounting the wing to the pivot member such that the pivot member is located at a position approximately 25 percent of the length of the wing from a leading edge.

3. The method as recited in claim 1, further comprising mounting the wing to the pivot member such that the pivot member is located at a position less than 25 percent of the length of the wing from a leading edge.

4. The method as recited in claim 1, further comprising mounting the wing to the pivot member such that the pivot member is located at a position greater than 25 percent of the length of the wing from a leading edge.

5. The method as recited in claim 2, wherein creating comprises creating the blunt trailing edge as a generally flat surface which transitions to adjacent wing surfaces via sharp corners, the blunt trailing edge having a height at least as great as 10 percent of the maximum thickness of the wing.

6. The method as recited in claim 3, wherein providing comprises forming the turbulence trigger mechanism as a strip located between 5 percent and 15 percent of the chord length of the wing from a leading edge of the wing.

7. The method as recited in claim 3, wherein providing comprises forming the turbulence trigger mechanism as a strip located approximately 10 percent of the chord length of the wing from a leading edge of the wing.

8. The method as recited in claim 3, wherein providing comprises providing a rough surface region.

9. The method as recited in claim 3, wherein providing comprises providing a negative step.

10. The method as recited in claim 3, wherein providing comprises providing a positive step.

11. The method as recited in claim 3, wherein providing comprises providing a positive step and a negative step.

12. A method of steering for use in seismic survey applications, comprising:

forming a steering device by mounting a wing to a body via a pivot member; and positioning a blunt edge along a trailing edge of the wing to maintain a positive torque acting about the pivot member at angles of attack approaching zero.

13. The method as recited in claim 12, further comprising pulling the steering device through an ocean to perform a seismic survey related operation.

14. The method as recited in claim 12, further comprising creating the blunt edge with a generally flat surface.

15. The method as recited in claim 12, further comprising lowering the torque at higher angles of attack by providing a turbulence trigger mechanism along the wing.

16. A system, comprising:

a steering device having a wing pivotably mounted to a body via a pivot member such that movement of the steering device through a liquid causes the wing to create a torque about the pivot member that varies according to an angle of attack, the steering device comprising a first feature acting to increase torque at angles of attack approaching zero and a second feature acting to decrease torque at higher angles of attack, wherein the second feature comprises a turbulence trigger mechanism positioned along a surface of the wing.

17. The system as recited in claim 16, wherein the pivot member is located at a position approximately 25 percent of the chord length of the wing from a leading edge.

18. The method as recited in claim 16, wherein the first feature comprises a blunt trailing edge of the wing.

* * * * *